United States Patent [19]
Matthews

[11] Patent Number: 6,026,991
[45] Date of Patent: Feb. 22, 2000

[54] APPARATUS, SYSTEM, AND METHOD FOR ADDITIZING A LIQUID PRODUCT

[75] Inventor: John Matthews, Cumming, Ga.

[73] Assignee: The Lubrizol Corporation, Wickliffe, Ohio

[21] Appl. No.: 09/181,740

[22] Filed: Oct. 28, 1998

[51] Int. Cl.$^7$ .................................................. B65D 88/54
[52] U.S. Cl. ......................... 222/334; 222/389; 222/386
[58] Field of Search ................................. 222/3, 154, 249, 222/389, 334, 159, 157, 388, 386, 333

[56] References Cited

U.S. PATENT DOCUMENTS

| | | | |
|---|---|---|---|
| 1,159,518 | 11/1915 | Maul | 222/159 |
| 1,589,997 | 6/1926 | Spaeth | 222/159 |
| 2,148,767 | 2/1939 | McGlade | 222/159 |
| 2,920,484 | 1/1960 | Reichert et al. | 73/319 |
| 2,935,391 | 5/1960 | Evans et al. | 48/195 |
| 3,235,348 | 2/1966 | Witcher et al. | 48/195 |
| 3,882,882 | 5/1975 | Preisig | 222/334 |
| 3,964,312 | 6/1976 | Sebek | 73/314 |
| 4,007,755 | 2/1977 | Lerner et al. | 137/101.21 |
| 4,611,294 | 9/1986 | Stanfill | 364/173 |
| 5,213,586 | 5/1993 | Welker | 48/195 |
| 5,406,970 | 4/1995 | Marshall et al. | 137/101.25 |

*Primary Examiner*—David J. Walczak
*Attorney, Agent, or Firm*—Beverly A. Pawlikowski

[57] ABSTRACT

An apparatus, process, and system for additizing a liquid product, allowing for visual inspection of the additive while it is being staged during a fill mode, or while the staged amount of additive is being supplied to an additive injector during an inject mode, for controlled injection into a liquid product.

13 Claims, 3 Drawing Sheets

APPARATUS, SYSTEM, AND METHOD FOR ADDITIZING A LIQUID PRODUCT

TECHNICAL FIELD

The present invention relates to an apparatus, system, and method for additizing a liquid product, and more particularly to the utilization of a visual sight indicator allowing for visual inspection of an additive while it is being staged during the fill mode, or while the staged amount of additive is being supplied to an additive injector during the inject mode for controlled injection into a liquid product.

BACKGROUND OF THE INVENTION

Systems for injecting additives into a liquid product, such as natural gas or propane, are generally known. Because natural gas is colorless and odorless, addition of liquid stenching agents, such as mercaptans, to odorize gas, is commonly used to warn users of dangerous gas leaks. In fact, gas odorization has been widely endorsed by the industry in an effort to detect gas leaks.

When adding a fluid additive to a fluid chemical product, it is necessary to precisely control the amount of additive added to the liquid product for several reasons. First, usually a specified minimum amount is required to perform the necessary function. Also, the additive fluids can be expensive, so their use must be carefully conserved. Because it is important to determine the amount of additive to be injected into a system, such as a pipeline, sophisticated systems have been developed to determine the quantity of additive injected.

However, there is a need in the industry for a system including an apparatus for additizing a liquid product that not only enables the operator to provide a staged amount of additive available for supplying an injector to dose a liquid product, but to visually verify the availability of the staged amount and usage of the staged amount of additive throughout the entire injection process and also at the end of the process.

SUMMARY OF THE INVENTION

The present invention relates to an apparatus, system, and method for additizing a liquid product utilizing a visual sight indicator that provides a fail-safe system that insures that the additization of the liquid product is successfully performed.

In accordance with one aspect of the invention, the visual sight indicator allows the operator to visually determine that a staged amount of additive is available to be supplied to an injector to additize a liquid product.

In accordance with another aspect of the invention, the visual sight indicator allows the operator to visually verify usage of the additive throughout the entire injection process, and therefore, to visually verify that the dosage has been successfully completed.

The foregoing and other features of the present invention are hereinafter fully described and particularly pointed out in the claims, the following description and the annexed drawings setting forth in detail a certain illustrative embodiment of the invention, representing but one of the various ways in which the principles of the invention may be employed.

DETAILED DESCRIPTION OF THE PREFERRED EMBODIMENT

Figure 1:
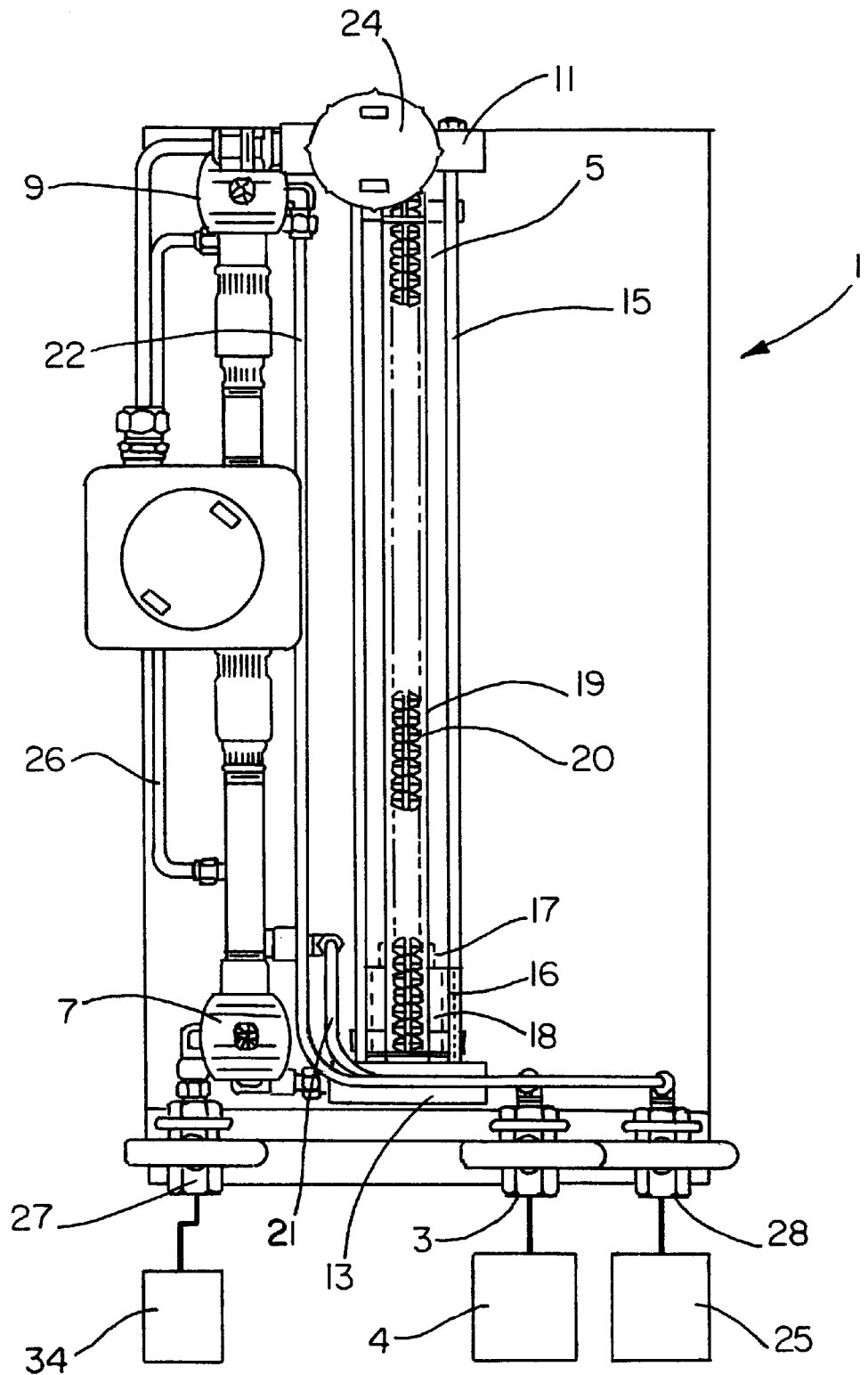
FIG. 1 is a front elevation view of a preferred form of a visual sight indicator according to the present invention.
Figure 2:
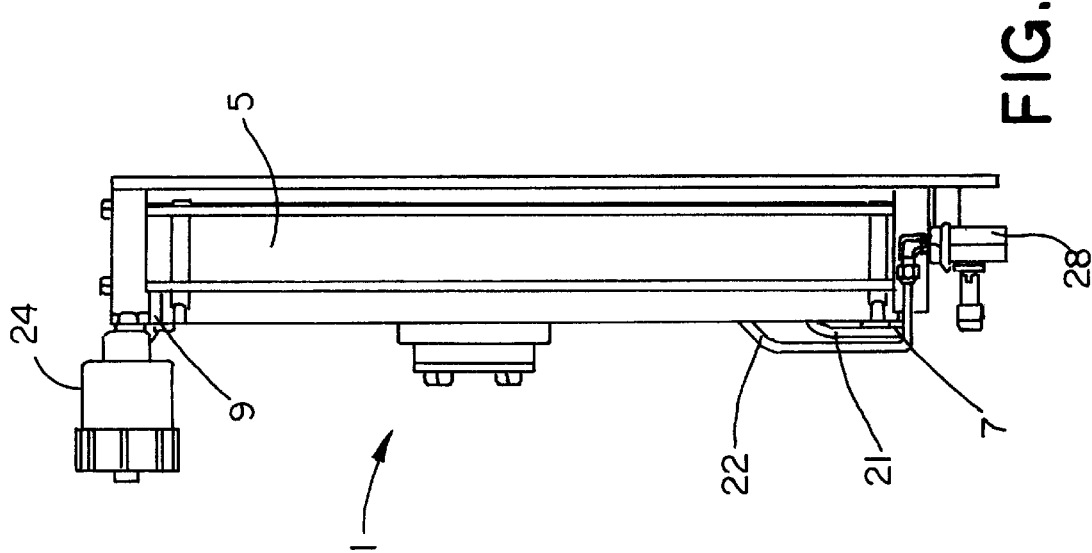
FIG. 2 is a side elevation view of the visual sight indicator of FIG. 1 as seen from the left-hand side thereof.
Figure 3:
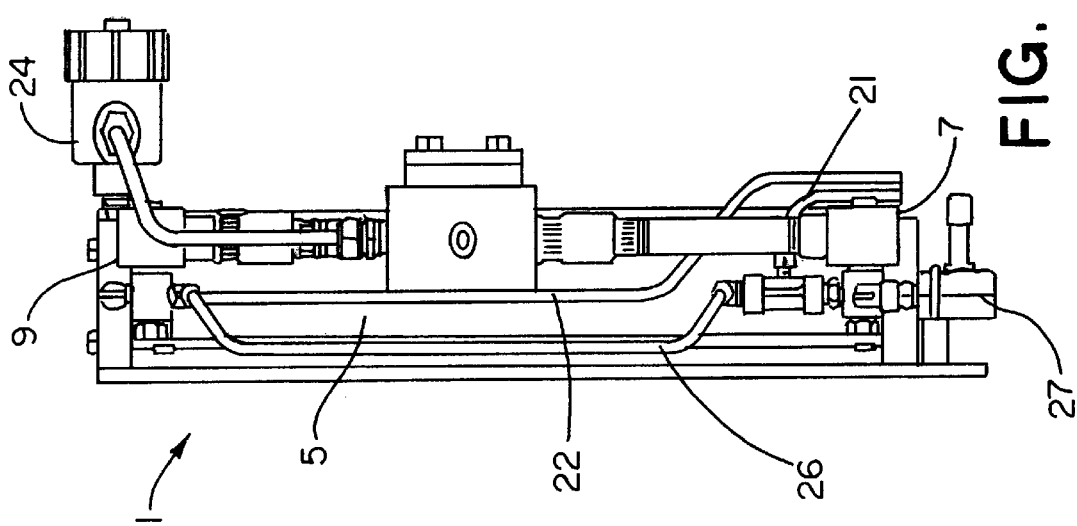
FIG. 3 is a side elevation view of the visual sight indicator of FIG. 1 as seen from the right-hand side thereof.

Referring now to the drawings, and initially to FIGS. 1, 2, and 3, there is shown a visual sight indicator system 1 according to the present invention, having inlet valve 3 that receives pressurized additive, such as mercaptan, from a pressurized additive source 4 (schematically shown in FIG. 1).

Pressurized additive entering inlet valve 3 is supplied to the lower end of a volumetric cylinder 5, upon activation of a solenoid 7, which is referred to as a fill solenoid, during a fill mode. Alternatively, pressurized additive entering inlet valve 3 is supplied to the upper end of volumetric cylinder 5 upon activation of a solenoid 9, which is referred to as an inject solenoid, during an inject mode.

Volumetric cylinder 5 is preferably made out of stainless steel, and has an inner diameter, for example, of 2 inches, and a length of, for example, 22 inches. At opposite ends of volumetric cylinder 5 are two end caps, 11 and 13, both of which are ported for fluid passage. Tie rods 15 hold ends caps 11, 13 and volumetric cylinder 5 together.

Within volumetric cylinder 5 is a free-floating piston 16, which carries a button magnet 17 and an annular magnet 18. Free-floating piston 16 is also preferably made of stainless steel. Suitable visual indicia, such as an external magnetic flag assembly 19, may be mounted on volumetric cylinder 5, to allow the operator to visually observe the axial position of free-floating piston 16 within volumetric cylinder 5. Magnetic flag assembly 19, may, for example, be of the type disclosed in U.S. Pat. No. 4,457,171, incorporated herein by reference in its entirety, and includes multiple flags 20 mounted in spaced relation along the length of the volumetric cylinder 5.

During movement of free-floating piston 16 within cylinder 5, as piston 16 passes each flag 20, piston magnet 18 causes each flag 20 of magnetic flag assembly 19 to flip over. Each flag 20 has two sides, one side being one color, the other side being a different color. As free-floating piston 16 rises within volumetric cylinder 5, each flag is flipped to show one of its sides, which may, for example, be orange in color, indicating the level of additive and, therefore, the amount of additive within the volumetric cylinder 5 available to be injected. As free-floating piston 16 descends within volumetric cylinder 5, each flag is flipped to its other side, which may, for example, be white in color, indicating the level of additive, and, therefore, indicating the amount of additive that has been injected.

Figure 4:
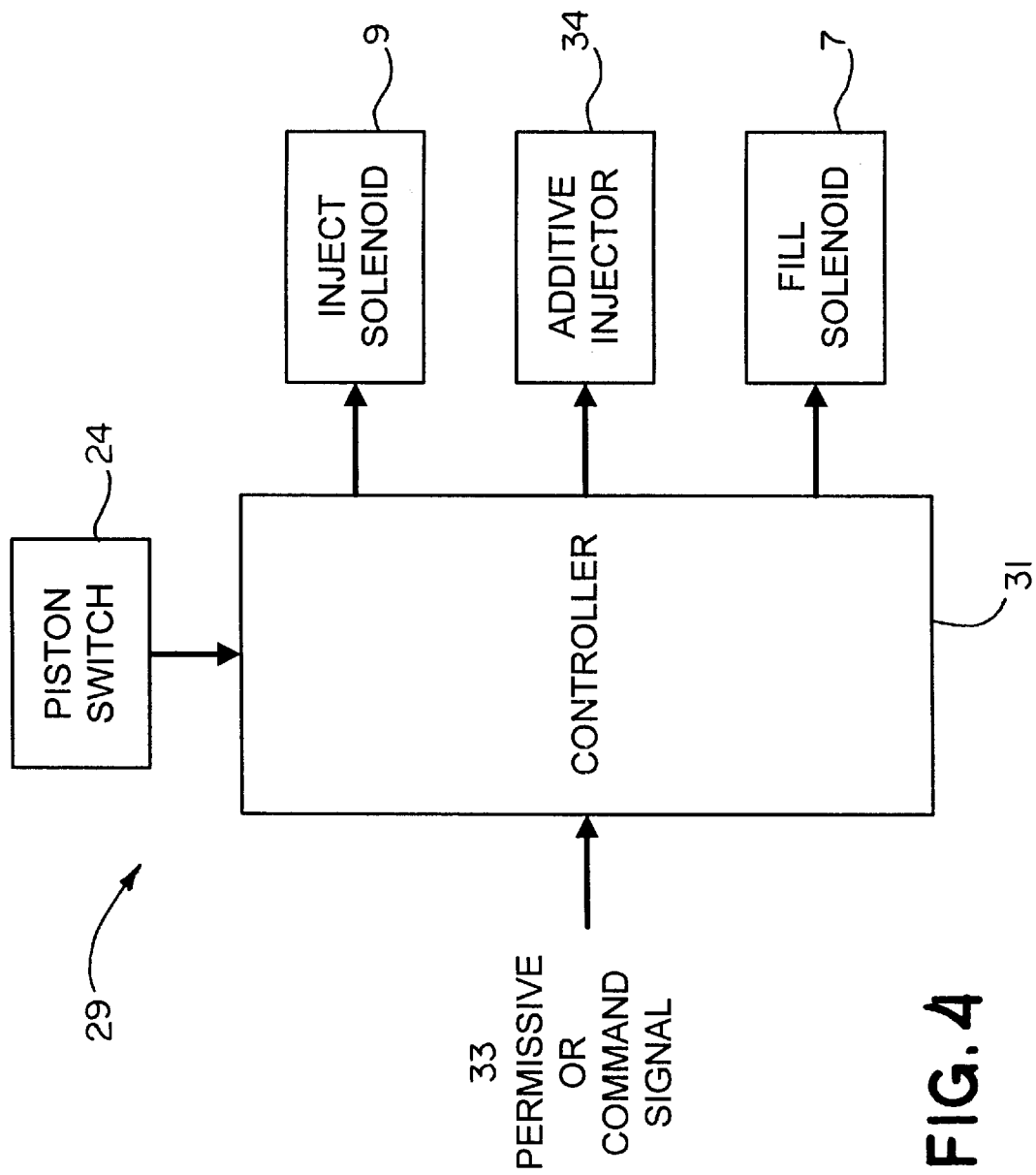
FIG. 4 is a schematic diagram of a system for additizing using the visual sight indicator shown in FIGS. 1–3.

FIG. 4 is a schematic diagram illustrating a control system 29 for the visual sight indicator system 1. The control system 29 includes a controller 31 that generates output signals which are received by either the fill solenoid 7 or the inject solenoid 9.

More specifically, when the visual site indicator system is in the fill mode, controller 31 sends an electrical signal to activate fill solenoid 7 and to deactivate inject solenoid 9 in response to a permissive or command signal 33 sent to controller 31 by the operator. The permissive or command signal 31 can be generated by a permissive signal device (not shown) or command signal device (not shown), such as any form of electrical switch, automated by a data system, or manually switched by the operator.

When the fill solenoid 7 is energized, pressurized additive entering at inlet valve 3 flows through piping 21 and fill solenoid 7 into the bottom of volumetric cylinder 5. As volumetric cylinder 5 is filled with additive, free-floating piston 16 moves up volumetric cylinder 5, causing each flag 20 to flip as free-floating piston 16 passes each flag 20 to visually indicate the additive level within volumetric cylinder 5 below piston 16. As piston 16 rises within cylinder 5, the additive above piston 16 flows out through deactivated inject solenoid 9 and piping 22 to bypass valve 28 for discharge into a container such as a storage tank 25 (schematically shown in FIG. 1).

When free-floating piston 16 reaches the top of volumetric cylinder 5, button magnet 17, located on the top of free-floating piston 16, touches and activates piston switch 24 that sends an electrical signal to controller 31 (shown in FIG. 4) indicating that a staged amount of additive is ready to be supplied to an additive injector 34 (shown in FIGS. 1 and 4) on command for controlled injection from the additive injector into a liquid product. A suitable additive injector that can be used in the present invention is disclosed in U.S. Pat. No. 5,251,785, incorporated herein by reference in its entirety.

In response to the electrical signal from piston switch 24, controller 31 deactivates fill solenoid 7 and activates inject solenoid 9, causing the visual sight indicator system 1 to operate in the inject mode. More specifically, this causes pressurized additive entering inlet valve 3 to flow through piping 21, to piping 26, through inject solenoid 9, into the top end of volumetric cylinder 5. As pressurized additive enters the top end of volumetric cylinder 5, it forces free-floating piston 16 downwardly, causing the staged amount of additive located beneath free-floating piston 16 to flow out the bottom of volumetric cylinder 5, through deactivated fill solenoid 7 and outlet valve 27 to an additive injector 34 (shown in FIGS. 1 and 4), then into a liquid product to be additized. As free-floating piston 16 moves down within volumetric cylinder 5, each flag 20 of external magnetic flag assembly 19 flips to display its other colored side, indicating the level of additive within volumetric cylinder 5, and, therefore, indicating the amount of additive being supplied to the injector.

When the inject mode is completed, the visual sight indicator system 1 can automatically re-set itself to the fill mode, or an operator can re-set it manually to the fill mode, to repeat the process as desired.

From the foregoing, it will be apparent that the visual sight indicator system 1 of the present invention allows the operator to view the entire filling of the volumetric cylinder 5 with pressurized additive. The operator is also able to view the entire injection process as the pressurized additive below free-floating piston 16 leaves volumetric cylinder 5 and is supplied to the additive injector. At the end of the injection process, the visual sight indicator system 1 allows the operator visually to see that the staged additive in the volumetric cylinder 5 has been successfully delivered into the additive injector. This feature provides a fail-safe mechanism which insures that the filling and injecting processes are successfully and fully completed.

As an alternative embodiment, the visual sight indicator system 1 can include other visual indicia, such as volumetric indicators or volumetric scales, that are strategically placed along tie rods 15, shown in FIG. 1, to visually indicate usage of the additive during the injection process.

When the staged amount of additive is completely injected, the system is re-set, and the cycle is repeated on the next permissive or command signal 33. To repeat the process, the operator must initiate a new permissive or command signal 33 to controller 31, or the system can automatically re-set itself.

Although the invention has been shown and described with respect to a certain preferred embodiment, it is obvious that equivalent alterations and modifications will occur to others skilled in the art upon the reading and understanding of the specifications. The present invention includes all such equivalent alterations and modifications, and is limited only by the scope of the claims.

What is claimed is:

1. An apparatus for additizing a liquid product, comprising:
   a volumetric cylinder;
   means for filling said volumetric cylinder with a staged amount of additive during a fill mode;
   means for supplying the staged amount of additive within said volumetric cylinder to an injector during an inject mode; and
   means for visually indicating an amount of additive within said volumetric cylinder during the fill mode or the inject mode,
   wherein said means for filling comprises a fill solenoid which is activated to introduce pressurized additive into a lower end of said volumetric cylinder during said fill mode, said volumetric cylinder containing a free-floating piston which rises as pressurized additive is introduced into the lower end of said volumetric cylinder during said fill mode.

2. The apparatus according to claim 1,
   wherein said means for supplying the staged amount of additive to said injector during the inject mode comprises an inject solenoid which is activated to introduce the pressurized additive to an upper end of said volumetric cylinder while said fill solenoid is deactivated to allow the pressurized additive within said volumetric cylinder below said free-floating piston to be supplied to said injector, wherein said free-floating piston descends as said staged amount of additive is supplied to said injector.

3. The apparatus according to claim 2, further comprising:
   a piston switch which is activated when said free-floating piston reaches an upper end of its stroke, sending an electrical signal to a controller to indicate that said volumetric cylinder is full of a staged amount of additive.

4. The apparatus according to claim 3, wherein said controller, in response to said electrical signal from said piston switch, deactivates said fill solenoid, and activates said inject solenoid for supplying the staged amount of additive to said injector.

5. The apparatus according to claim 1,
   wherein said means for visually indicating an amount of additive comprises a magnetic flag assembly mounted on said volumetric cylinder, responsive to movement of said free-floating piston.

6. A process for additizing a liquid product, comprising:
   filling a volumetric cylinder with a staged amount of additve during a fill mode;
   supplying the staged amount of additive within the volumetric cylinder to an injector during an inject mode; and
   visually indicating the amount of additive within the volumetric cylinder during the fill mode or the inject mode, wherein the volumetric cylinder has a free-floating piston which rises as the additive is introduced into the volumetric cylinder during the fill mode, and descends as the staged amount of additive is supplied to the injector during the inject mode; and wherein the volumetric cylinder has a piston switch located at the top of the volumetric cylinder which is activated when the free-floating piston reaches an upper end of its stroke, sending an electrical signal to a controller to indicate that the volumetric cylinder is full of a staged amount of additive.

7. The process according to claim 6, further comprising:

deactivating a fill solenoid and activating an inject solenoid for supplying the staged amount of additive to the injector.

8. The process according to claim 7, further comprising:

repeating the fill mode after completion of the inject mode.

9. A system for additizing a liquid product, comprising:

a visual sight indicator, and an injector connected to said visual sight indicator, said visual sight indicatorcomprising:

a volumetric cylinder;

means for filling said volumetric cylinder with a staged amount of additive during a fill mode;

means for supplying the staged amount of additive within said volumetric cylinder to said injector during an inject mode; and means for visually indicating the amount of additive within said volumetric cylinder during the fill mode or the inject mode, wherein said means for filling comprises a fill solenoid for introducing additive into a lower end of said volumetric cylinder during the fill mode, said volumetric cylinder containing a free-floating piston which rises as additive is introduced into said volumetric cylinder during the fill mode.

10. The system according to claim 9, wherein said means for supplying the staged amount of additive to said injector during the inject mode comprises and inject solenoid which is activated to introduce pressurized additive into an upper end of said volumetric cylinder while said fill solenoid is deactivated, to introduce the staged amount of additive to said injector.

11. The system according to claim 10, further comprising:

a piston switch which is activated when said free-floating piston reaches an upper end of its stroke, sending an electrical signal to a controller to indicate that said volumetric cylinder is full of a staged amount of additive.

12. The system according to claim 11, wherein said controller, in response to said electrical signal from said piston switch, deactivates said fill solenoid, and activates said inject solenoid for supplying the staged amount of additive to said injector.

13. The system according to claim 9, wherein said means for visually indicating an amount of additive comprises a magnetic flag assembly mounted on said volumetric cylinder, responsive to movement of said free-floating piston.

\* \* \* \* \*